June 4, 1935.  E. T. JOHNSON  2,003,365
AGRICULTURAL IMPLEMENT
Filed Aug. 18, 1934
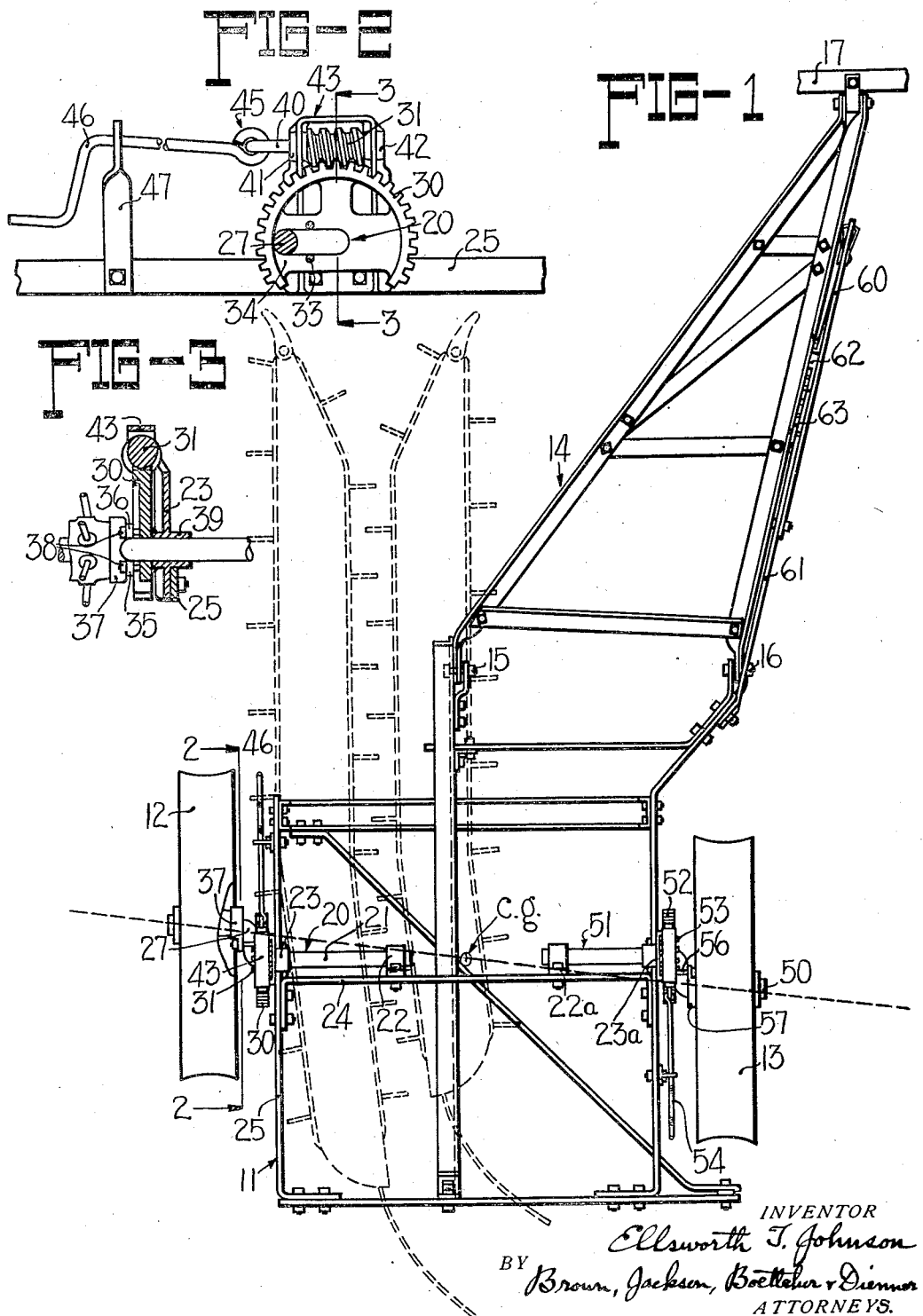
INVENTOR
Ellsworth T. Johnson
BY Brown, Jackson, Boettcher & Dienner
ATTORNEYS.

Patented June 4, 1935

2,003,365

UNITED STATES PATENT OFFICE 2,003,365

AGRICULTURE IMPLEMENT

Ellsworth T. Johnson, Moline, Ill., assignor to Deere & Company, Moline, Ill., a corporation of Illinois Application August 18, 1934, Serial No. 740,378

5 Claims. (Cl. 56—215)

The present invention relates generally to agricultural implements and more particularly to that type of implement, such as a corn binder, corn picker, grain binder and the like, in which the operating mechanism of the implement is mounted upon a main frame which is supported on two laterally spaced wheels and arranged in substantially balanced relation thereon to be tilted for the purpose of adjusting the position of the crop gathering unit of the implement relative to the ground. In implements of this general type it is also desirable, particularly in the case of grain binders and corn binders, to provide for additional adjustment by which the frame may be raised and lowered relative to the supporting wheels, and it is the principal purpose of the present invention to provide for these adjustments so that the frame may be raised and lowered relative to the ground without disturbing the balance of the machine so that the other adjustments, such as the fore and aft tilting adjustment, will not be affected.

An agricultural implement of this general type is shown in the patent issued July 24, 1934, to Wilbur J. Coultas and Norman F. Andrews, No. 1,967,498, and it is also the purpose of the present invention to provide certain improvements, particularly along the lines mentioned above, in the manner in which the supporting wheels are arranged for adjustment. In the implement shown in the aforesaid patent, there is a main frame supported on two laterally spaced wheels and provided with a draft frame pivotally connected to the main frame at its rear end for movement about a generally horizontal transverse axis and pivotally connected at its forward end to a pulling vehicle, such as a tractor, for both vertical and horizontal swinging movement. This construction provides for tilting the main frame about its two supporting wheels for the purpose of adjusting the position of the crop gathering unit of the implement relative to the ground, and to lock the main frame in any adjusted position as well, there is provided an adjustable connection between the main frame and the draft frame in the form of a tilting lever which is fixed to and extends forwardly from the main frame and is provided with a latch which cooperates with a sector carried on the draft frame.

Specifically, it is an object of the present invention to provide an implement of this kind with improved and simplified means by which the supporting wheels are made adjustable for the purpose of raising and lowering the main frame with respect to the ground but without disturbing the relations between the draft frame and the main frame or otherwise tilting the implement in a generally fore and aft direction, so that the balance of the machine need not be disturbed, whereby any subsequent necessity for tilting the machine will not require the exertion of any excessive force, as would be the case if the raising and lowering adjustments of the main frame threw the machine out of balance.

Heretofore it has been proposed to provide for raising and lowering an implement frame by supporting the axles of the wheels in pinions which engage racks fixedly supported on the frame; then by rotating the pinions and holding them in adjusted position, the frame can be raised and lowered relative to the wheels.

Another important object of the present invention is to substitute for this type of adjusting mechanism for connecting the supporting wheels to the main frame of an implement, the crank axle type of mounting which is simpler and appreciably less expensive. It is characteristic of the crank axle type of mounting that the wheels shift fore and aft relative to the frame as the frame is adjusted vertically with respect to the wheels. If, therefore, a single through crank axle were used on an implement such as a corn binder, or even if two separate crank axles were used with the cranked portions thereof extending in the same direction, the balance of the machine would be affected by the vertical adjustment of the wheels relative to the frame. This would seriously affect the ease with which the implement could be tilted in certain positions of adjustment of the wheels relative to the frame. In order that it be possible to tilt the machine with the least amount of effort, the implement must be substantially balanced over its two supporting wheels. If the two supporting wheels are shifted fore and aft relative to the implement away from the position in which the implement is balanced thereover, considerable effort will be required to tilt the implement.

A further object, therefore, of the present invention is to overcome this difficulty relative to the balance of the implement by mounting the two wheels on separate crank axles having cranked portions which extend in opposite directions; that is, the cranked portion of one crank axle extends forwardly and the cranked portion of the other crank axle extends rearwardly. Vertical adjustment of the implement relative to the wheels is obtained by rotating one crank axle in one direction and the other crank axle in the opposite direction.

Still further, another object of the present invention is to so position the crank axles on the frame that the wheels carried by the crank axles are disposed in a generally transverse vertical plane passing through the center of gravity of the implement. Thus, when the implement is adjusted vertically by cranking the axles, one wheel moves rearwardly and the other wheel moves forwardly, and the vertical plane passing through the wheels, while it has an angular movement with respect to the frame, always passes substantially through the center of gravity of the implement in all adjusted positions of the wheels. As a result, the implement will be maintained substantially balanced over the wheels in all vertically adjusted positions of the implement relative to the wheels.

These and other objects and advantages of the present invention will be apparent to those skilled in the art after a consideration of the following detailed description of the preferred structural embodiment, taken in conjunction with the accompanying drawing illustrating such embodiment.

In the drawing:

Figure 1 is a top plan view of the main frame and draft frame of an implement of the type referred to above, the operating unit being indicated in dotted lines;

Figure 2 is an enlarged fragmentary section taken along the line 2—2 of Figure 1; and Figure 3 is a section taken along the line 3—3 of Figure 2.

Referring now to the drawing, more particularly to Figure 1, the main frame of the implement is indicated by the reference numeral 11 and is supported on two laterally spaced wheels 12 and 13. A draft frame 14 is pivotally connected to the forward end of the main frame 11 for vertical swinging movement about a generally horizontal transverse axis by means of pivot bolts 15 and 16. The draft frame 14 is adapted to be pivotally connected at its forward end to a pulling vehicle, such as a draw bar 17 of a tractor.

The left hand supporting wheel 12 is adjustably connected to the main frame 11 by means of a crank axle 20, the axle portion 21 of which is journaled in bearing brackets 22 and 23. The inner bracket 22 is bolted to the side of the center transverse frame member, indicated by the reference numeral 24, and the outer bracket 23 is bolted to the outer side of the longitudinally extending frame member, indicated by the reference numeral 25. The wheel 12 is journaled on the spindle of the cranked portion 27 of the axle 20, and this cranked portion 27 extends forwardly.

For rocking the crank axle 20, relative to the frame 11 for the purpose of adjusting the vertical position thereof, I provide a mechanism which includes a worm gear 30 and a worm 31 meshing therewith. The worm gear 30 is mounted upon the crank axle 20 in a position concentric with the axle portion 21 thereof, as that shown in Figure 2, and the worm gear 30, constituting the operating member of the adjusting mechanism, is fixed to the crank axle by means of U-bolt 33 which extends through perforations in the web 34 of the worm gear 30 and through perforations in lugs 35 and 36 formed integral with a sand collar 37 which is disposed on a cranked portion 27 of the axle and is arranged to at least partially embrace the hub of the wheel 12. A pair of nuts 38 are provided on the threaded ends of the U-bolt 33, and by tightening the nuts 38 the U-bolt 33 forms a means for not only clamping the worm gear 30 but the U-bolt 33 also serves as a means for holding the sand collar 37 in position.

The bearing brackets 22 and 23 are provided with suitable bearing means for rockably receiving the axle portion 21 of the crank axle 20, and the bearing portion of the bracket 23 is indicated by the reference numeral 39 in Figure 3. This figure also shows that the bearing bracket 23 is extended upwardly and laterally, and receives a shaft 40 which is journaled in bearing openings 41 and 42 provided in a bracket 43 which is formed integral with and extends upwardly from the bracket 23. The shaft 40 carries the worm 31 mentioned above and serves to hold the worm 31 in mesh with the operating gear 30. The forward end of the shaft 40 is connected by means of a double eye connection 45 with a crank 46 supported by bracket 47 which is fixed to the frame member 25. By turning the crank 46, the crank axle 20 will be rocked relative to the frame 11 and will raise and lower the same relative to the supporting wheel 12.

The right hand wheel 13 is supported by substantially the same arrangement as the left hand wheel 12 except that the cranked portion of the crank axle for the wheel 13 extends rearwardly whereas the cranked portion 27 of the crank axle 20 for the left hand wheel 12 is disposed forwardly, as mentioned above. Referring now to Figure 1, the right hand wheel 13 is journaled on the cranked portion 50 of a crank axle 51 which is rockably mounted on the main frame 11 by bearing brackets 22a and 23a which are identical for all practical purposes with the bearing brackets 22 and 23 described above. Also, the crank axle 51 is provided with mechanism for rocking it similar to the mechanism for rocking the crank axle 20, and this mechanism includes a worm gear 52 fixed to the crank axle 51 and a worm 53 meshing with the worm 52 and rotated by means of a crank 54. As stated above, the cranked portion 50 of the crank axle 51 extends rearwardly instead of forwardly, as is the case with the cranked axle portion 27 of the crank axle 20. The operating member for this adjusting mechanism, namely, the worm gear 52, is securely fixed to the crank axle 51 by substantially the same means described above in connection with the left hand wheel 12, namely, by a U-bolt 56 which embraces the cranked portion of the crank axle 51 and reacts against and holds in place a sand collar 57 in clamping the worm gear 52 in place.

In the implement shown in Figure 1, tilting of the same in a generally fore and aft direction for raising and lowering the operating unit with respect to the ground is accomplished by changing the angular position of the main frame 11 with respect to the draft frame 14 by mechanism which can be locked in any adjusted position. Any suitable mechanism may be provided for this purpose as, for example, the type of adjusting lever mechanism illustrated in the patent mentioned above. Specifically, in the present invention, a tilting lever 60 is provided and which is connected at its rear end to a forwardly extending frame 61 which is fixedly connected at its rear end to the main frame 11. The tilting lever 60 is provided with a latch 62 which cooperates with a sector 63 carried by the draft frame 14. By raising and lowering the lever 60, the angular relation between the main frame 11 and the draft frame 14 may be adjusted, and by this means the implement can be tilted about its support on the wheels 12 and 13.

In order to adjust the implement vertically, relative to the wheels 12 and 13, the crank axle 20 is rocked in one direction and the crank axle 51 is rocked in the opposite direction, by suitably rotating the cranks 46 and 54 in the proper direction. The two crank axles 20 and 51 are positioned on the main frame at such points that the wheels 12 and 13 are disposed in a generally transverse vertical plane, indicated in dotted lines in Figure 1, which passes through the center of gravity c. g. of the implement. Now if one of the wheels is rocked rearwardly through the same distance that the other wheel is rocked forwardly, the generally transverse plane passing through the wheels and their points of contact with the ground, will still pass through the center of gravity of the implement. Thus, raising and lowering the frame on the wheels 12 and 13 will not in any way affect the ease with which the implement can be adjusted by the tilting lever 60.

While I have shown and described above the preferred construction in which the principles of the present invention have been embodied, it will be apparent that my invention is not to be limited to the particular details shown and described above, but that, in fact, widely different means may be employed in the practice of the broader aspects of my invention.

What I claim, therefore, and desire to secure by Letters Patent is:

1. An implement comprising a main supporting frame on which the operating parts of the implement are mounted, a pair of supporting wheels on opposite sides of said main frame, means cooperating with said supporting wheels for supporting said main frame with the center of gravity of the implement disposed in a generally transverse vertical plane which passes through the points of contact of said wheels with the ground, and means for swinging one of said wheels downwardly and forwardly and the other of said wheels downwardly and rearwardly to raise the frame relative to the ground while keeping the center of gravity of the implement in said plane.

2. An implement comprising a main frame upon which the operating parts of the implement are mounted, a pair of supporting wheels, one disposed at each side of said frame, means cooperating with one end of said main frame for supporting the same with the center of gravity of the implement lying substantially in the generally transverse vertical plane which passes through the points of contact of said wheels with the ground, crank axles connecting said wheels with said frame, the crank axle at one side of the frame having a crank portion extending rearwardly while the crank axle at the other side of said frame has its crank portion extending forwardly, means reacting against said supporting means for tilting the implement about its support on said wheels, and means for swinging one of said crank axles forwardly and the other rearwardly for raising and lowering said main frame while keeping the center of gravity of the implement in the vertical transverse plane passing through the points of contact of said wheels with the ground.

3. An implement comprising a main frame upon which the operating parts of the implement are mounted, a pair of wheel supported crank axles on opposite sides of said frame for supporting the latter and positioned for rocking movement in longitudinal vertical planes, the cranked portions of said axles extending in opposite directions, said axles being mounted on said frame at points such that the wheels thereon are disposed in a generally transverse vertical plane passing through the center of gravity of the implement, and means for rocking said axles in opposite directions to raise or lower the implement, whereby the implement will be maintained substantially balanced over the wheels on said axles in all positions of said axles.

4. An implement comprising a main frame upon which the operating parts of the implement are mounted, a pair of wheel supported crank axles on opposite sides of said frame for supporting the latter and positioned for rocking movement in longitudinal vertical planes, the cranked portions of said axles extending in opposite directions, said axles being mounted on said frame at points such that the wheels thereon are disposed in a generally transverse vertical plane passing through the center of gravity of the implement, means for tilting said main frame in a generally fore and aft direction about its support on said wheels while the implement is substantially balanced thereon, and means for rocking said axles in opposite directions to raise or lower the implement, whereby the implement will be maintained substantially balanced over the wheels on said axles in all positions of said axles.

5. An implement comprising a main frame upon which the operating parts of the implement are mounted, a pair of wheel supported crank axles on opposite sides of said frame for supporting the latter and positioned for rocking movement in longitudinal vertical planes, the cranked portions of said axles extending in opposite directions, said axles being mounted on said frame at points such that the wheels thereon are disposed in a generally transverse vertical plane passing through the center of gravity of the implement, a draft frame pivotally connected at the rear to said main frame for vertical movement relative thereto about a transverse axis and adapted to be connected to a pulling vehicle at its front end, means for adjusting the angular position of said draft frame relative to said main frame to tilt the implement, and means for rocking said axles in opposite directions to raise or lower the implement, whereby the implement will be maintained substantially balanced over the wheels on said axles in all positions of said axles.

ELLSWORTH T. JOHNSON.